STABILIZERS FOR CHLORINE-CONTAINING RESINS AND PROCESS FOR PRODUCING THE SAME

This is a continuation of application Ser. No. 632,036 filed Nov. 14, 1975 now abandoned.

BACKGROUND OF THE INVENTION

1. Field of the Invention

The present invention relates to a stabilizer for chlorine-containing resins which is non-toxic, which serves to prevent secondary aggregation of the resins while they are being shipped, and particularly which improves the workability of the resins, and further to a process for producing such stabilizers.

2. Description of the Prior Art

Examples of chlorine-containing resins used in this invention include, for example, polyvinyl chloride, most commonly commercially available with a chlorine content of around 56.6 wt%; polyvinylidene chloride, most commonly commercially available with a chlorine content of around 73.2 wt%; a' vinyl chloride-vinylidene chloride copolymer; a vinyl chloride-vinyl acetate copolymer, most generally commercially available with a vinyl acetate content of 0.4 to 40 wt%, more often 0.5 to 20 wt%; a vinyl chloride-ethylene copolymer, most generally commercially available with an ethylene content of 1 to 15 mole % and a mean molecular weight of 700 to 1500; chlorinated vinyl chloride, most generally commercially available with a chlorine content of 60 to 70 wt%, more often 63 to 68 wt%; and chlorinated polyethylene, most generally commercially available with a chlorine content of 25 to 45 wt%. These materials undergo thermal decomposition during molding, and require a stabilizer to prevent such thermal decomposition. As later will be explained in detail, the present invention provides such a stabilizer.

Heretofore, inorganic acid salts, organic acid metal salts, and organic tin compounds have generally been used as such stabilizers.

Many of these stabilizers are toxic, e.g., those which contain lead, and accordingly their use is limited. Recently, non-toxic calcium hydroxide which has thermal stability and is very inexpensive has come into popular use.

However, particulate calcium hydroxide does not have a smooth surface, so that when the particulate calcium hydroxide or a chlorine-containing resin powder containing such particulate calcium hydroxide is shipped, or particularly when it is automatically fed, the calcium hydroxide aggregates (this phenomenon will hereafter be referred to as secondary aggregation). This phenomenon eventually degrades the dispersibility of the calcium hydroxide in the chlorine-containing resin powder, or degrades the quality of molded products made of such a mixture of a higher proportion of the products must be rejected as unacceptable, because the calcium hydroxide migrates to the surface of the molded products or adheres to metal molds.

SUMMARY OF THE INVENTION

Various investigations were conducted by the inventors to overcome these drawbacks, and they found that calcium hydroxide coated with a calcium salt of an organic acid can be used as a non-toxic stabilizer for chlorine-containing resins which prevents secondary aggregation while they are being shipped, improves the workability of the resins upon molding to a substantial extent, and imparts long-term thermal stability to the resins.

The primary object of the present invention is to provide a stabilizer for chlorine-containing resins which comprises calcium hydroxide coated with a calcium salt of organic acid.

Another object of the invention is to provide a process for producing such a stabilizer, which comprises reacting calcium hydroxide with an organic acid at a molar ratio of 1: not more than 2, in the presence of a medium and a surface active agent, while heating and stirring.

DETAILED DESCRIPTION OF THE INVENTION

The term "medium" as is used herein means water or an organic solvent(s). If desired, the water may contain a suspension stabilizer (such as a suspender, dispersant or surface active agent). Examples of "aqueous mediums" include water, an ammonia solution, an aqueous PVA solution, etc. Examples of an organic solvent "medium" includes hydrocarbon solvents such as petroleum ether, cyclohexane, benzene, etc.; alcohol solvents such as methanol, ethanol, propanol, etc.; halogenated hydrocarbon solvents such as trichloroethane, perchloroethane, etc.; ether solvents such as amylphenyl ether, etc.; and ketone solvents such as acetone, methyl ethyl ketone, etc.; and compatible mixtures thereof.

It is believed that calcium hydroxide disperses into an aqueous solution containing a surface active agent in a suspended state rather than dissolving in the aqueous solution.

Examples of suitable surface active agents used in this invention include nonionic surface active agents such as polyoxyethylene alkylphenyl ethers, polyoxyethylene alkyl ethers, polyoxyethylene alkyl esters, sorbitan alkyl esters, polyoxyethylene sorbitan alkyl esters, etc.; anionic surface active agents such as fatty acid salts, sulfuric acid esters of higher alcohols, sulfuric acid esters of aliphatic amines or amides, etc.; cationic surface active agents such as aliphatic amines, quaternary ammonium salts, etc.; and mixtures thereof. The surface active agent provides a sufficient effect even in an amount of less than 0.1% based on the total system weight. Surface active agents having an HLB (hydrophilic-lypophilic balance) of 4 to 17 are generally used.

As organic acids useful in the present invention, there can be exemplified monocarboxylic acids (caprylic acid, capric acid, lauric acid, myristic acid, palmitic acid, stearic acid, behenic acid, acrylic acid, methacrylic acid, ricinolic acid, etc.), dicarboxylic acid monoesters (monoesters of oxalic acid, malonic acid, succinic acid, glutaric acid, adipic acid, pimelic acid, suberinic acid, azelaic acid, sebacic acid, etc.), unsaturated dicarboxylic acid monoesters (monoesters of maleic acid, fumaric acid, citraconic acid, mesaconic acid, itaconic acid, aconitic acid, etc.), aromatic monocarboxylic acids (benzoic acid, salicylic acid, etc.), aromatic dicarboxylic acid monoesters (monoesters of phthalic acid, terephthalic acid, etc.), thiocarboxylic acids (thioglyconic acid, mercaptolactic acid, mercaptopropionic acid, etc.), beef tallow hardened fatty acids, fish oil hardened fatty acids, and oxy fatty acids.

The preferred organic acids used in this invention include saturated and unsaturated fatty acids having 10 to 22 carbon atoms, such as capric acid, lauric acid, palmitic acid, stearic acid, arachic acid, oleic acid, ricinolic acid, etc.; dicarboxylic acid monoalkyl esters hav-

United States Patent [19]

Tanioka et al.

[11] 4,158,075

[45] Jun. 12, 1979

[54] STABILIZERS FOR CHLORINE-CONTAINING RESINS AND PROCESS FOR PRODUCING THE SAME

[75] Inventors: Katsuhiko Tanioka, Shiga; Toshihiko Matsuzawa; Noboru Iida, both of Otsu; Naoji Makino; Itirow Hayasaka, both of Kawasaki, all of Japan

[73] Assignees: Sekisui Kagaku Kogyo Kabushiki Kaisha, Osaka; Shinagawa Chemical Industry Co., Ltd., Tokyo, Japan

[21] Appl. No.: 878,634

[22] Filed: Feb. 17, 1978

Related U.S. Application Data

[63] Continuation of Ser. No. 632,036, Nov. 14, 1975, abandoned.

[51] Int. Cl.$^2$ .............................................. B05D 7/24
[52] U.S. Cl. ................................ 427/220; 106/308 F; 260/42.14; 260/42.49; 428/403

[58] Field of Search .................. 427/220, 399; 106/308 Q, 306, 308 F; 260/42.14, 42.49, 23 XA; 428/403

[56] References Cited

FOREIGN PATENT DOCUMENTS 721467 1/1952 United Kingdom ...................... 427/220
728698 4/1955 United Kingdom ...................... 427/220

*Primary Examiner*—Sam Silverberg
*Attorney, Agent, or Firm*—Sughrue, Rothwell, Mion, Zinn and Macpeak

[57] ABSTRACT

A stabilizer for chlorine-containing resins, comprising calcium hydroxide coated with a calcium salt of an organic acid, and a process for producing the same wherein calcium hydroxide and an organic acid are reacted at a molar ratio of 1 mole of calcium hydroxide: not more than 2 moles of organic acid in the presence of a medium and a surface active agent, while heating and stirring, to convert the outer surface of the calcium hydroxide to a calcium salt of the organic acid.

3 Claims, No Drawings a core, thus forming a stabilizer of calcium hydroxide coated with calcium stearate.

In all examples the particle size distribution of the calcium hydroxide used was as follows, in which the defined values refer to the amounts which remain on the sieve size recited.

| 40 mesh | 0.2% |
| 60 mesh | 8.4 |
| 100 mesh | 26.15 |
| 150 mesh | 26.4 |
| 200 mesh | 29.35 |
| others | 29.25 |

EXAMPLE 2

100 Parts by weight of polyvinyl chloride was mixed with 3 parts by weight of calcium hydroxide treated according to Example 1(5), except for varying the amount of stearic acid as indicated in Table 2. The resulting mixtures were subjected to the Congo Red test at 190° C. based on JIS K 6732. The thermal stability test results are shown in Table 2 as Examples 2(1)–(3).

Comparative Example 1 relates to the case where 3 parts by weight of calcium hydroxide alone was added, and Comparative Examples 2 to 4 relate to the cases where 3 parts by weight of a mere mixture of calcium hydroxide and calcium stearate in an amount proportional to that used in each of Examples 2(1) to (3) was added.

Table 2

|  | Example 2 | | | Comparative Examples | | | |
| --- | --- | --- | --- | --- | --- | --- | --- |
|  | (1) | (2) | (3) | 1 | 2 | 3 | 4 |
| Polyvinyl chloride | 100 | 100 | 100 | 100 | 100 | 100 | 100 |
| Calcium hydroxide | — | — | — | 3 | 2.94 | 2.91 | 2.85 |
| Calcium stearate | — | — | — | — | 0.06 | 0.09 | 0.15 |
| Coated calcium hydroxide (amount of stearic acid before reaction) | 3 (2%) | 3 (3%) | 3 (5%) | — | — | — | — |
| Thermal resistance time (min. second) | 15.10 | 16.30 | 21.50 | 13.00 | 13.00 | 13.00 | 14.00 |

The thermal resistance time in Comparative Example 1, where only calcium hydroxide was added, was 13 minutes, while that in each of Examples 2(1)–(3) where the calcium hydroxide coated with calcium stearate was added (the amount of the stearic acid used for the reaction based on the calcium hydroxide was respectively 2%, 3%, and 5%) was extended (15.10 minutes, 16.30 minutes and 21.50 minutes, respectively).

The thermal resistance times in Comparative Examples 2 to 4 wherein calcium hydroxide and calcium stearate were used in combination in the amounts as indicated in Table 2, respectively correspond to those of Example 2(1) to (3), i.e., 13.00 minutes vs. 15.10 minutes, 13.00 minutes vs. 16.30 minutes and 14.00 minutes vs. 21.50 minutes. These results establish that the use of the "coated" calcium hydroxides of the invention provides longer thermal stability than the use of a mere mixture of calcium hydroxide and calcium stearate as in the Comparative Examples.

EXAMPLE 3

A test on flowability was conducted as follows: 50 g each of the coated calcium hydroxides prepared by the method of Example 1(5) and untreated calcium hydroxide were poured into conventional funnels 170 mm tall, the conical top of the funnel being 90 mm tall and 90 mm in diameter across the top, and the tubular section of the funnel extending from the conical top being 80 mm long and having various diameters as shown in Talbe 3. The conical walls of the funnel made an angle of 70° with respect to horizontal. Upon removing the stopper of each funnel, the slump was measured. The results are shown in Table 3.

Table 3

| Diameter of funnel (mm) | 5 | 10 | 15 | 20 | 30 | 40 | 50 |
| --- | --- | --- | --- | --- | --- | --- | --- |
| Untreated calcium hydroxide | X | X | X | X | Δ | O | O |
| Coated calcium hydroxide | X | Δ | O | O | O | O | O |

O : slump of substantially all powder
Δ : partial slump of powder
X : no slump of powder As is seen from Table 3, the coated calcium hydroxide of the invention has good flowability, totally slumping in funnels of a 15 mm or a larger diameter, while the untreated calcium hydroxide did not slump in funnels of up to 30 mm in diameter.

With specimens similar to the above, the repose angle (angle with respect to horizontal of the slope naturally formed when a powdery substance is heaped) was measured. In the case of the untreated calcium hydroxide, the angle was 53°08′, while in the case of the coated calcium hydroxide prepared by the method of Example 1(5) of the present invention, it was 48°11′, proving reduced secondary aggregation and improved flowability. Untreated calcium hydroxide has considerable inter-particle friction and also strong inter-particle affinity, which cause formation of secondary aggregation of calcium hydroxide alone, in the course of transportation. On the other hand, the smooth film formed with calcium stearate over the outer surface of calcium hydroxide in accordance with the present invention serves to reduce the secondary aggregation of the particles, and thus provides remarkably improved flowability.

EXAMPLE 4

A powdery mixture of 100 parts by weight of polyvinyl chloride, 3 parts by weight of the coated calcium hydroxide of Example 1, 1.5 parts by weight of calcium stearate, 0.7 part by weight of montanic acid ester wax, 0.5 part by weight of low molecular polyethylene (average polymerization degree: 2000) and 0.3 part by weight of a pigment was subjected to an extrusion test with a 90 mm twin screw extruder provided with a 40 mesh screen (between the extruder and the die) and a die for 60 mm diameter plastic pipe.

An identical mixture except for substituting untreated calcium hydroxide for the coated calcium hydroxide was used as a control.

In the case of the control, secondary aggregation of white calcium hydroxide was observed on the surface of the pipe at a rate of one occurrence for every 1 m of pipe length. In the case of the present invention, no such aggregation was observed.

The mixtures were also subjected to independent continuous extrusion to observe the condition of the metal mold and the screen. In the case of the untreated calcium hydroxide, on the third day the screen was plugged with secondary aggregates and, after 7 working days, the mold was removed to discover a brownish solid substance adhered in a 0.5–1 mm thickness over the entire chromium-plated surface of the metal mold. In the case of the present invention, while on the 6th day the screen was found to be plugged with sand, dusts, impurities, cabonaceous materials and the like, it was not plugged with a secondary aggregate, and after 14 working days, the metal mold was removed with no adhesion on the chromium-plated surface thereof.

While the invention has been described in detail and with reference to specific embodiments thereof, it will be apparent to one skilled in the art that various changes and modifications can be made therein without departing from the spirit and scope thereof.

What is claimed is:

1. A process for producing a thermal stabilizer for chlorine-containing resins which comprises calcium hydroxide coated with a calcium salt of an organic acid selected from the group consisting of saturated fatty acids having 10–22 carbon atoms and mixtures thereof, where calcium hydroxide and said organic acid are reacted at a molar ratio of 1 mole of calcium hydroxide: not more than 2 moles of said organic acid, in the presence of an aqueous medium and a surface active agent selected from the group consisting of polyoxyethylene alkylphenyl ethers, polyoxyethylene alkyl ethers, polyoxyethylene alkyl esters, fatty acid salts, sulfuric acid esters of higher alcohols, sulfuric acid esters of aliphatic amines or amides, quaternary ammonium salts and mixtures thereof, while heating and stirring at about 90° to 100° C., to convert the outer surface of the calcium hydroxide into a calcium salt of said organic acid.

2. The process of claim 1, wherein said organic acid is selected from the group consisting of stearic acid and palmitic acid.

3. The process of claim 1, wherein said calcium salt comprises from about 2 to about 10 wt% of said organic acid, based on the weight of said calcium hydroxide.

* * * * *